United States Patent
Clay (10) Patent No.: US 7,032,633 B2
(45) Date of Patent: Apr. 25, 2006

(54) CUTTING TOOL AND SYSTEM FOR CORING A BOWL USING A LATHE

(76) Inventor: Tymen Clay, 241 Monteith Avenue, Stratford, Ontario (CA) N5A 2P6

( * ) Notice: Subject to any disclaimer, the term of this patent is extended or adjusted under 35 U.S.C. 154(b) by 239 days.

(21) Appl. No.: 10/469,564

(22) PCT Filed: Mar. 1, 2002

(86) PCT No.: PCT/CA02/00280

§ 371 (c)(1),
(2), (4) Date: Dec. 8, 2003

(87) PCT Pub. No.: WO02/070214

PCT Pub. Date: Sep. 12, 2002

(65) Prior Publication Data

US 2004/0134317 A1 Jul. 15, 2004

(30) Foreign Application Priority Data

Mar. 1, 2001 (CA) .................................... 2336239

(51) Int. Cl.
*B27M 3/00* (2006.01)

(52) U.S. Cl. ............................ 144/33; 142/49; 142/56; 407/65; 407/113

(58) Field of Classification Search .................. 144/33, 144/3.1, 1.1, 360, 371; 142/56, 1, 32, 49, 142/37–39; 407/113, 65, 103
See application file for complete search history.

(56) References Cited

U.S. PATENT DOCUMENTS

| | | | |
|---|---|---|---|
| 134,219 A * | 12/1872 | Richards | 188/68 |
| 259,196 A | 6/1882 | Neff | |
| 341,182 A | 5/1886 | Stoner | |
| 652,015 A * | 6/1900 | Cunningham | 407/83 |
| 1,487,538 A * | 3/1924 | Chadek | 142/38 |
| 1,519,344 A | 12/1924 | Allemeier | |
| 2,068,625 A * | 1/1937 | Burton | 142/38 |
| 3,014,509 A * | 12/1961 | Cederblad | 142/56 |
| 3,140,627 A * | 7/1964 | Walby | 82/161 |
| 3,191,471 A | 6/1965 | Stewart | 82/36 |
| 3,229,731 A * | 1/1966 | Hilton | 142/56 |

(Continued)

OTHER PUBLICATIONS

Burrows D, "A New Twist for Turners/Pivoting headstocks simplify the ins and outs of bowls", Feb. 1, 1993, pp. 82-84.

(Continued)

*Primary Examiner*—Bena Miller
(74) *Attorney, Agent, or Firm*—Gifford, Krass, Groh, Sprinkle, Anderson & Citkowski, P.C.

(57) ABSTRACT

A cutting tool piece is provided including a rear portion and a lead portion, the lead portion including a front section having an upper side angled downwardly and forwardly and a lower side angled upwardly and forwardly to form a transverse lead cutting edge. The rear portion includes a hole to secure the tool piece to a cutting tool and transverse cutting edges extending outwardly from side walls of the front section. A system is also described for cutting a bowl by coring out an interior portion of a wood block by applying the cutting tool which is curved and rotatably mounted to a post. Its lead end with the tool piece attached creates a circular groove. The cutting tool is advanced on a path which curves toward the central axis of the lathe.

18 Claims, 5 Drawing Sheets

U.S. PATENT DOCUMENTS

| | | | |
|---|---|---|---|
| 3,276,493 A | | 10/1966 | Smith |
| 3,298,405 A | | 1/1967 | Loof |
| 3,825,981 A | * | 7/1974 | Cochran et al. ............ 407/101 |
| 4,063,577 A | * | 12/1977 | Tennant ....................... 142/49 |
| 4,126,165 A | * | 11/1978 | Guignard et al. ............. 142/56 |
| 4,509,886 A | * | 4/1985 | Lindsay ...................... 407/102 |
| 4,998,572 A | | 3/1991 | Lukes ......................... 142/55 |
| 5,224,529 A | * | 7/1993 | Kenny ......................... 142/42 |
| 5,441,089 A | * | 8/1995 | Lazarou ....................... 142/49 |
| 5,839,333 A | | 11/1998 | McKay ....................... 82/1.11 |

OTHER PUBLICATIONS

Catalog of Kelton Industries Limited, 1999; pp. 8-10.
Graduate GL Brochure, by Graduate Lathe Company Ltd. —undated but published prior to 2001.
General catalog, 1990, by General Mfg. Co. Ltd., pp. 40-42.

* cited by examiner

CUTTING TOOL AND SYSTEM FOR CORING A BOWL USING A LATHE

This invention relates to a cutting piece, a cutting tool, a system for forming a bowl utilizing a lathe, and a method for using the aforementioned system.

Lathes are used in the art of carving wood pieces by spinning wood pieces at sufficient speed and applying a sharp instrument to the wood piece for patterning or carving. The lathe typically includes a flat horizontal bed with rails mounted on the bed. Typically a support block or tool rest for supporting a cutting tool is slidably mounted on the bed rails. The cutting tool may be manually applied to the face of a wood block, using the support block or tool rest as a fulcrum to manipulate the tool upon the wood. When cutting tools are manually applied, accurate, consistent patterning of the wood piece is difficult to achieve. Cutting tools have also been secured upon the lead edge of a cutting member which is slidably or rotatably secured to the support block or tool rest. Sliding the support block along the bed rails to a position adjacent to the wood piece allows for selective application of the cutting piece by rotating or sliding the cutting member upon the sliding block.

The use of a lathe machine to construct bowls is known. A bowl may be constructed using a lathe by manually applying a cutting instrument to carve out an interior portion of the wood piece. Typically the cutting instrument is rested on a tool rest or support block and the tool rest or support block acts as a fulcrum for the tool. Manual application of the tool makes it difficult to achieve consistency between work pieces. To allow for more consistent application when constructing a bowl using a lathe machine, a cutting tool may be rotatably mounted via a post upon a support block slidable on the bed rails. The support block is slidably positioned and secured adjacent to the wood piece. A cutting member having a cutting piece at its lead end extends from the post. The cutting member may then be rotated on a fixed path into contact with the wood piece creating a fixed radius cored bowl. To bore out bowls of selectively various sizes, the cutting members have consisted of a series of blades of varying curves and lengths. Using such fixed path cutting machines makes the desired consistency between bowls easier to achieve.

Known cutting pieces secured at the lead ends of cutting members used to cut wood using a lathe have been known to be susceptible to catching in the wood, causing excess vibration and excessive rotational forces caused by the spinning wood piece. These factors in turn tend to cause excess wear on the lathe machine and damage and distortion of the cutting member, posts and various components of the lathe machine.

Cutting pieces are known to have a substantially flat or rounded upper side extending from the lead edge of a cutting member to a cutting edge extending substantially transversely across the lead edge of the piece. Typically, a substantially vertical and/or slightly angled lead face extends downwardly from the transverse cutting edge. The transverse cutting edge is applied to the wood block attached to the lathe. Such pieces are susceptible to catching and tend to create significant rotational force on the cutting edge as it is applied to the rotating wood block.

Cutting pieces are also disclosed having a spear cutting point for application to the wood block. Although such a spear point will reduce the likelihood of catching, they are known to cause significant vibration to the machine.

Tool pitch is the rotational pulling force on the cutting edge of the tool caused as it is applied to the rotating block of wood. As the cutting edge extends into the wood and away from the support block or tool support, tool pitching increases.

In order to reduce the amount of pitch on the lead edge of the cutting member, various types of supports are known to be positionable below the lead edge of the cutting tool as it is applied to the wood block. Such a support surface supports the cutting member as it is initially inserted into the wood. Because the support sits directly below or close to the lead edge of the cutting member, lead edge pitching is reduced.

Once the lead edge of cutting tool has been inserted substantially into the wood block, it becomes more susceptible to pitching because there is no support directly below it. As the lead edge of the cutting member enters the wood piece when cutting a groove, supports disclosed in the prior art are not capable of following the lead edge of the cutting tool into the wood. Thus, such supports are not capable of preventing pitching as the tool head is advanced into the block of wood. The problem of pitching of the lead edge of the cutting tool becomes greater when using longer cutting members curved for bowls of larger radius, since they are separated by more distance from the tool support as they enter into the wood piece.

There is a need for an improved cutting piece or attachment for cutting wood using a lathe and there is a need for an improved system for forming or coring bowls using a lathe.

The present invention provides an improved cutting piece for use with a cutting tool that can be used to form a bowl by means of a lathe. The cutting tool attachment disclosed herein reduces the catching of the tool head when cutting into a block of wood.

According to another aspect of this invention, there is also provided an improved bowl forming system which can be used with a lathe and which provides support to the lead edge of a cutting tool as it advances into the wood piece thereby reducing tool pitch and subsequent stress on the lathe and components.

In accordance with a first aspect of the invention there is provided a cutting piece for securement to a lead end of a cutting tool comprising a rear portion securable to the lead end of the cutting tool by a securing mechanism formed on the rear portion. A lead portion of the cutting piece extends forwardly from the rear portion and the lead portion having a front section is adapted to extend beyond the lead end of the cutting tool. The lead portion is narrower in a transverse direction than a forward end of the rear portion and it has two sidewalls located on opposite sides thereof. The front section has an upper side angled downwardly and forwardly and a lower side angled upwardly and forwardly. The upper and lower sides form a front end of the lead portion which forms a leading cutting edge. The rear portion includes further cutting edges extending outwardly from a respective one of the side walls of the lead portion.

According to second aspect of the invention, there is provided a system for forming a bowl utilizing a lathe which rotates a block for the bowl about a horizontal axis during use of the system. The system comprises a support block slidably engageable on the lathe bed and positionable adjacent a face of the wood block when the block is mounted for rotation on the lathe. A first post is mounted on the support block and extends upwardly therefrom. An elongate cutting tool is rotatably mounted on the first post, this cutting tool including a cutting portion which is curved and extends to a lead end. The lead end includes a cutting device for cutting and coring the block and applicable to the face of the block by rotating the cutting tool about the first post so that the cutting device cuts a circular groove in the block about the rotation axis. The cutting portion extends on a curved path toward this axis as the lead end advances into the block. A second post includes an upper support surface. A support member is rotatably secured on this post and is movable thereupon from a first support position to a secondary support position. In the first support position, the second post is positioned adjacent the face of the block. In the secondary support position, the support member is arranged such that it can be advanced into the groove directly below the cutting tool, thereby providing support for the lead end of the cutting portion as the cutting portion is advanced through the block.

According to a third aspect of the invention, there is provided a cutting tool for use with a lathe, the tool comprising an elongate body portion which is curved in the lengthwise direction thereof, has two lateral sides located on opposite sides of the body portion, and has a lead end with a lead portion projecting forwardly beyond the two lateral sides. The lead portion has a front section having an upper side angled downwardly and forwardly and a lower side angled upwardly and forwardly such that the upper and lower sides form a leading cutting edge. The lead portion also has two vertically extending side walls located on opposite sides thereof. The lead end of the tool is formed with outer cutting edges extending transversely of the lateral sides and outwardly from a respective one of the vertically extending sidewalls of the lead portion.

An advantage provided by the first and third aspect of the invention is that the configuration of the cutting piece reduces the likelihood of catching of the cutting piece and cutting tool as they are applied to the block for cutting a groove.

An advantage to the second aspect of the invention is that support can be provided to the lead edge of the cutting tool as it advances into a groove created in the block, therefor reducing the amount of tool pitch and stress and reducing vibration and wear and stress on the lathe machine and components thereof.

According to a further aspect of the invention, there is provided a cutting piece for cutting a groove in a workpiece mounted in a lathe, the cutting piece comprising a rear portion securable to a lead end of the cutting tool and a lead portion rigidly connected to the rear portion and extending forwardly from the rear portion. The lead portion is narrower in a transverse direction than an adjacent forward end of the rear portion, is adapted to extend beyond the lead end of the cutting tool, and has two sidewalls located on opposite sides of the lead portion and a sloping upper side that extends downwardly and forwardly and a lower side sloping upwardly and forwardly such that the upper and lower sides form a leading cutting edge. The upper and lower sides define an angle not exceeding ninety degrees. The rear portion has further cutting edges each extending outwardly from a respective one of the sidewalls of the lead portion.

Preferred embodiments of the invention will now be described in conjunction with the accompanying drawings.

Shown in FIGS. 1 to 6 is one preferred embodiment of the cutting piece or attachment for cutting a groove in a workpiece such as a wood block. The preferred embodiment of the cutting piece 10 has a rear portion 12 securable to a lead end of a cutting tool and a lead portion 14 which extends forwardly from the rear portion. The lead portion has a front section 16 extending beyond the lead end 74 of a cutting tool 70. The front section has a sloping upper side 24 angled downwardly and forwardly, and a lower side 26 angled upwardly and forwardly. The upper side 24 and lower side 26 meet at a front end 28 of the lead portion to form a leading transverse cutting edge 30. Preferably the upper side 24 and the lower side 26 define an angle not exceeding 90 degrees and more preferably an angle less than 90 degrees. In one preferred embodiment, the acute angle defined between the upper side 24 and the lower side is about 75 degrees and the preferred range for this angle is between 60 and 75 degrees. The edge 30 extends substantially transversely relative to a central longitudinal axis A extending from a rear end 31 of the cutting piece to the leading cutting edge.

Preferably the cutting piece 10 is securable to the upper surface of the lead end 74 of the cutting tool 70 by means of a screw 32 (see FIG. 6) inserted through a bore 34 in the rear portion of the cutting piece 10 and fastened to the lead end of the cutting tool. Alternatively it is possible to omit the bore 34 and to attach the cutting piece by other means such as brazing.

Although the preferred edge 30 extends transversely as shown, it is possible for this edge to extend at a small acute angle, for example up to about 10 degrees, from the perpendicular to the central, longitudinal axis A.

Preferably, the rear portion 12 has cutting edges 36 and 38 which each extend beyond the side walls 40, 42 of the cutting tool. The cutting edges also extend outwardly from a respective one of two opposite sidewalls 41,43 of the lead portion, which is narrower in a transverse direction than a forward end of the rear portion 12. The cutting edges 36, 38, extend beyond the side walls 40, 42 so as to create an effective cutting width for the groove which is greater than the width of the cutting tool. As shown in FIGS. 6 to 10, application of the cutting piece 10, secured to the lead end 74 of the cutting tool 70, to a wood block 100 rotating on a lathe 102, creates a circular groove 104 in said wood 100 which has a width greater than the width of the cutting tool, thereby allowing the cutting tool to be advanced into the groove 104. It should be noted that the spear point formed by the upper and lower sides 24, 26 acts as an effective brake to prevent the positive cutting edges 36, 38 from being pulled into the wood block as the cutting proceeds.

Preferably the cutting piece 10 is made of a suitable steel and includes a plurality of longitudinal slots 48 on its bottom side, which are configured to align with mating ridges on an upper portion of the lead end of the cutting tool 70 to help locate the cutting piece 10 on the cutting tool and to enhance rigid securement of the cutting piece on the cutting tool. Instead of steel, the cutting piece can be made of other known hard cutting materials such as carbide.

Shown in FIGS. 7 to 11 is the preferred embodiment of a system for forming or coring a wooden bowl utilizing a lathe. The preferred embodiment includes a support block 60, slidably engageable on support rails 62 of a lathe bed 64. The support block is releasably positionable adjacent a face of a wood block 100 which is rotatable about a horizontal axis on the lathe 102. The support block preferably includes an elongate slot 61 on its upper surface, this slot extending transversely of the support rails 62 of the lathe. Preferably a first post 66 is mounted on the support block by bolts 68 extending through two holes formed in a connecting plate at the base of the post. The cutting tool 70 is rotatably mounted on the first post. The cutting tool includes a cutting portion 72 which is curved and extends to the lead end 74. The lead end 74 has the cutting piece 10 extending therefrom. The cutting piece at the lead end is applicable to the face 101 of said wood block 100 by rotating the cutting tool about the first post. Preferably, the cutting tool also includes a handle portion 76 extending horizontally from the rear end of cutting portion. The handle portion can be utilized to rotate the lead end of the cutting portion into engagement with the face of the wood block. As the wood block spins on the lathe about the horizontal lathe axis, and the lead end with attached cutting piece is applied to the wood block face 101 so as to cut thereinto, a circular groove 104 in the wood block is created which extends around the lathe axis. Further rotation of the cutting tool about the first post 66 causes the lead edge of the cutting portion to extend into the wood block on a curved path. As the lead edge advances into the wood block, its moves closer to the axis of rotation of the wood block. As such, the diameter of the circular groove 104 diminishes as the lead edge advances into the wood block. Once the lead edge advances into the wood and approaches the axis of rotation of the wood block, the lead edge causes a central portion of wood 108 to become separable from the wood block. A bowl or concave cavity is formed by the removed central wood portion 108.

The preferred system further includes a support post 80 (hereinafter sometimes referred to as the "second post") providing an upper support surface 82 and a support member 84 rotatable about the post 80 and extending from this post in a curved path which is similar in its curvature to that of the cutting portion 72. The support post is releasably slidable upon the upper side of the support block and is releasably held in the desired position by means of a bolt 92 inserted through a slot 86 in a base plate 90 of the post. The bolt 92 extends through the groove 61 in the support block and is held in the block. The support post is movable from a first initial position shown in FIGS. 7, 8 and 11 to a second position shown in FIGS. 9 and 10.

In the first position, the support post 80 sits adjacent to the wood block face and the lead edge of the cutting portion rests on the support surface. In the first support position the support surface 82 sits adjacent the wood face and is positioned below the location where the cutting member engages the wood block thereby providing support for the lead edge 74 of the cutting tool as it engages the wood face.

In the first position, the supporting member 84 is rotated out of contact with the wood block. As the lead edge 74 is advanced into the wood block, the support post 80 can be moved into the second position. Preferably the support post is moved into the second position as follows: The bolt 92 is slightly loosened so as to allow the support post to move along the groove 61 in the support block and to allow rotation and sliding of the post about the bolt 92. In the second support position, the support post is rotated and aligned such that the support member 84 can be advanced into the groove at a position directly below the cutting portion 72. Once the second post is located in the second position, the support member 84 may be advanced by advancing the support post towards the wood block. The support post can be selectively secured and released in progressively advanced positions by tightening and loosening the bolt 92. Thus, the support member provides support for the lead edge 74 of the cutting tool as it is advanced into the groove. By keeping the support member close to the lead edge of the cutting portion, tool pitch is diminished as the cutting portion extends into the wood block.

The system described above is preferably used as follows: The user fixes and rotates a wood block 100 upon a lathe, rotating it about a central horizontal axis. The support block 60 is positioned adjacent to the wood block. The cutting tool is rotated about the first post 66 by the handle portion 76 and the lead edge 74 is applied to the wood face, thereby creating the circular groove 104. The support surface 82 is positioned directly below the lead edge as it engages the wood face thereby providing support therefor.

As the groove 104 becomes deeper, the support post 80 is moved to the secondary support position. The cutting portion 72 is advanced further into the wood block. The support member 84 is inserted into the groove at a position below the cutting member and is advanced into the groove providing support for the lead edge of the cutting member as it advances into the groove, reducing tool pitch. The cutting tool 72 continues to be advanced into the groove, with the support member 84 providing support therefor until an internal portion of the wood block is separated from the wood block, thereby leaving a bowl or concave cavity in the wood block.

Figure 1:
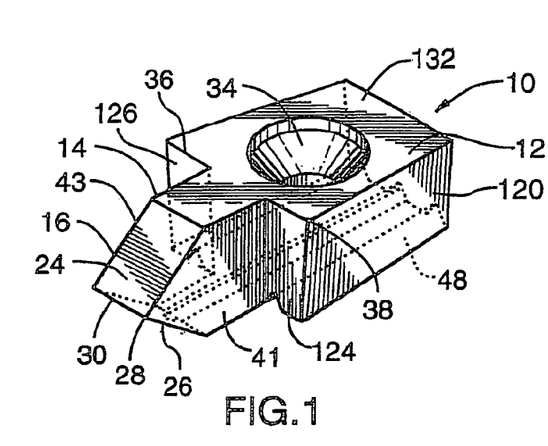
FIG. 1 is perspective view of the preferred embodiment of the cutting piece.
Figure 2:
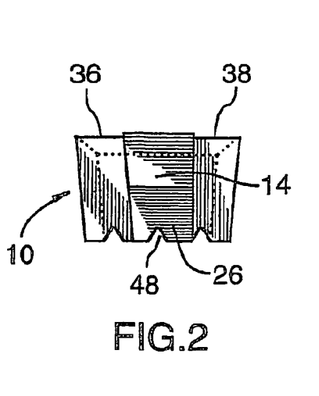
FIG. 2 is front elevation of the preferred embodiment of the cutting piece.
Figure 3:
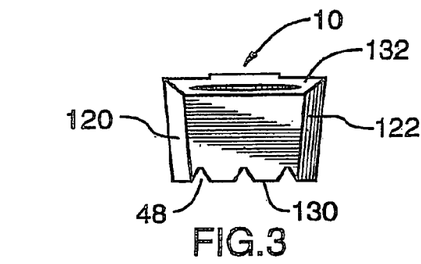
FIG. 3 is a rear side elevation of the preferred embodiment of the cutting piece.
Figure 4:
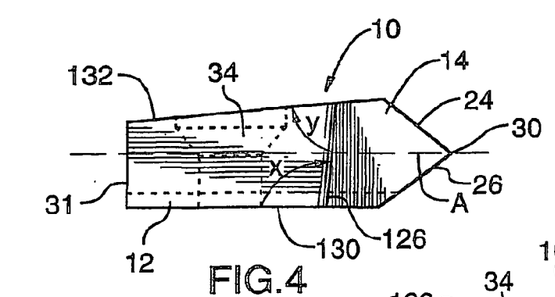
FIG. 4 is a side elevation of the preferred embodiment of the cutting piece.
Figure 5:
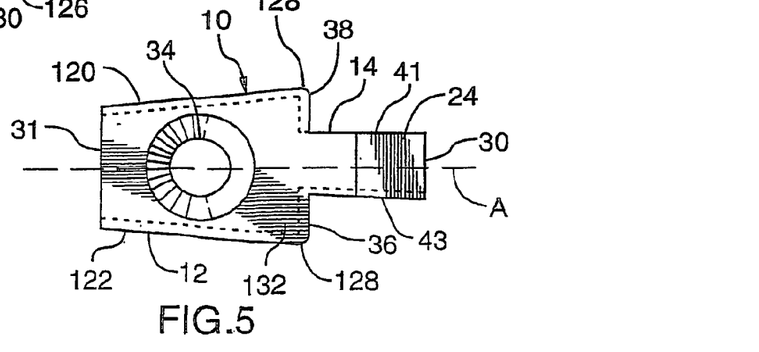
FIG. 5 is a top view of the preferred embodiment of the cutting piece.
Figure 6:
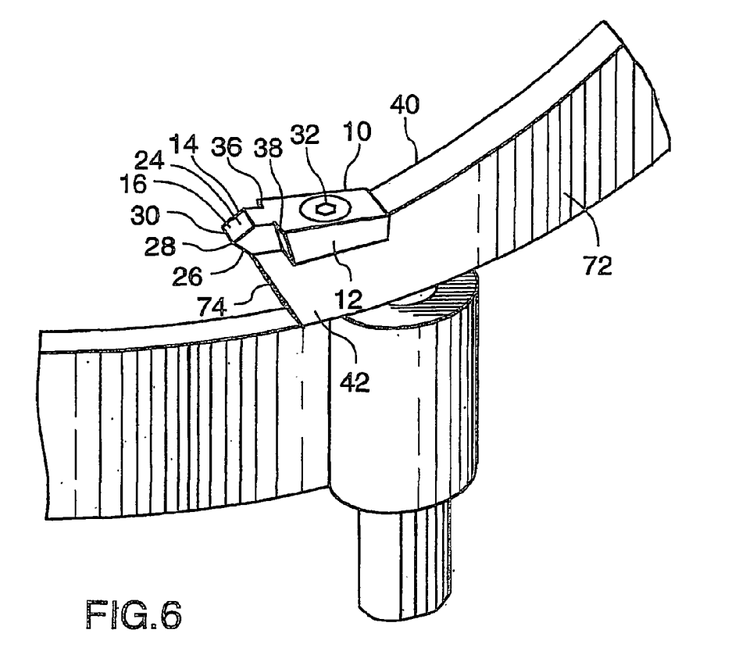
FIG. 6 is a perspective view of the preferred embodiment of the cutting piece attached to a preferred cutting tool.

The preferred features of the preferred cutting piece 10 will now be described with reference again to FIGS. 1 to 5 of the drawings. With respect to the rear portion of this cutting piece, the preferred embodiment has two vertically extending sidewalls 120 and 122. It will be seen that these sidewalls taper slightly towards the central longitudinal axis A in a rearwards direction. At the front end of these sidewalls are two vertically extending leading faces 124 and 126. As illustrated in FIG. 5, where the sidewalls meet the leading faces, the corner edges are preferably rounded or formed with a small radius indicated at 128. These radii have not been shown in some of the figures for ease of illustration. The end piece has a bottom 130 which for the purposes of this description can be considered as extending horizontally (not including the aforementioned grooves 48 formed in the bottom). As can be seen from FIG. 4, the preferred leading faces 124, 126 extend at an obtuse angle that is more than 90 degrees to the bottom 130. In a preferred embodiment, this obtuse angle ranges from about 95 degrees to 100 degrees and is indicated by angle X. The end piece also has a top 132 which is planar and which can extend at a relatively small acute angle to the plane of the bottom 130. Thus, when the bottom 130 is in a horizontal plane, the plane of the top 132 extends at a small acute angle to the horizontal plane and slopes upwardly and forwardly. In other words, the top 132 extends at a positive rake. In the illustrated embodiment, this small acute angle or positive rake is between 5 and 10 degrees (most preferably 5 degrees). In this preferred embodiment, the acute angle formed between the two leading faces 124, 126 and the top of the end piece and indicated at Y in FIG. 4 is approximately 80 degrees. Because of the slight upward and forward slope of the top, it will be seen that the two cutting edges 36, 38 formed on opposite sides of the end piece have a positive edge geometry which is good for the free cutting of the wood. This is different than the negative geometry formed by the spear point created by the aforementioned upper side 24 and the lower side 26. The advantage of the negative geometry of the spear point formed by the lead portion 14 is that it is non-catching when applied to the rotating wood block.

Figure 12:
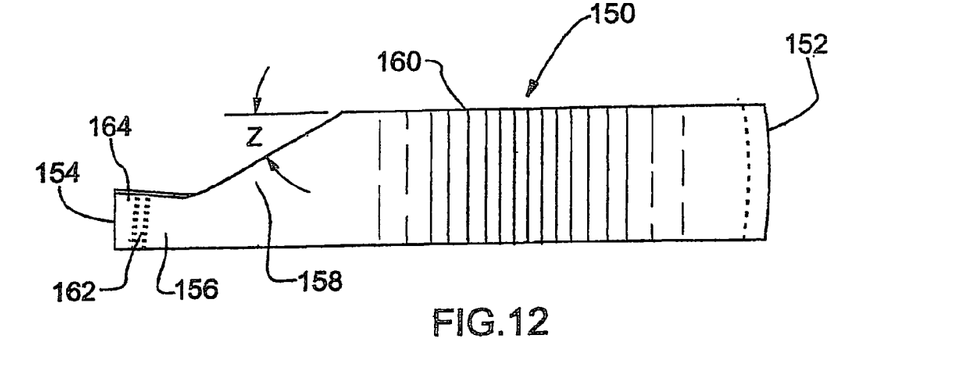
FIG. 12 is a side view of an alternate form of curved holder for the cutting piece of the invention.
Figure 13:
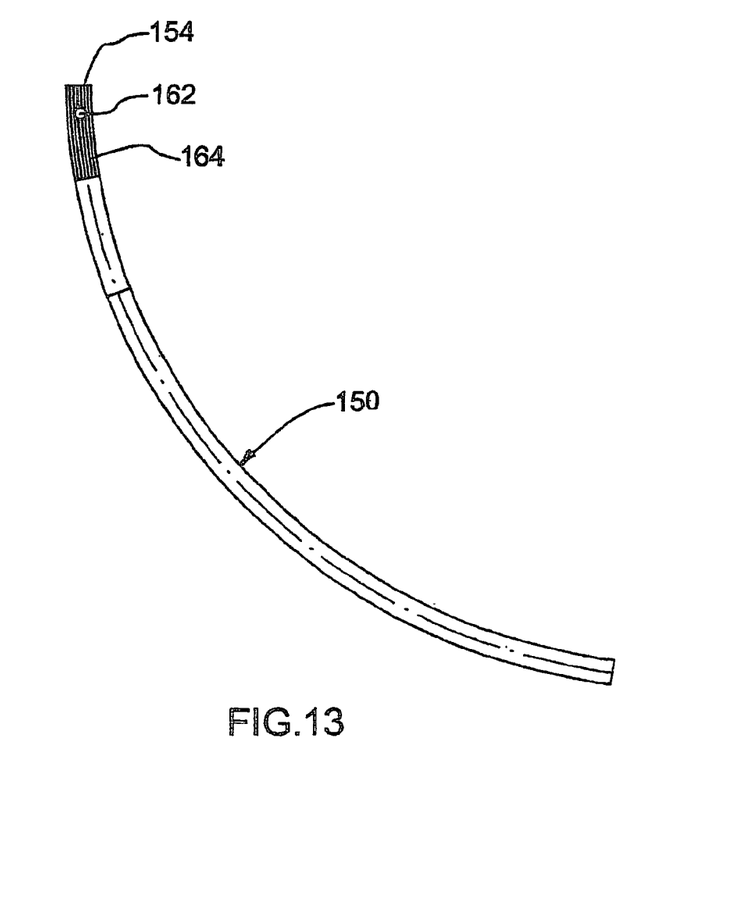
FIG. 13 is a top view of the curved holder of FIG. 12.

In an alternate form of the cutting piece 10, the top 132 is parallel to the plane of the bottom 130 and this cutting piece is then mounted on a cutting tool holder such as that shown in FIGS. 12 and 13 so that its top 132 will extend in use at a small angle to the horizontal plane, i.e. five degrees.

It will be seen from the above description of FIGS. 7 to 11 that the cutting tool 70 has a vertical pivot axis formed by its support post. It can be moved in two horizontal directions during use of the cutting tool. Thus the post 66 can be moved horizontally along the support rails 62 by adjusting the position of the support block 60 and it can also be moved transversely of the support rails 62 by adjusting the position of the post along the slot 61 (using the aforementioned adjustment bolt 68). By being able to move the support post 66 in these two different horizontal directions, the centre point of the radius of the cutting portion 72 can be moved. This advantage together with the provision of cutting portions 72 of cutting tools having different radii provides the possibility of producing a wide variety of bowl sizes using the system of the invention.

Figure 7:
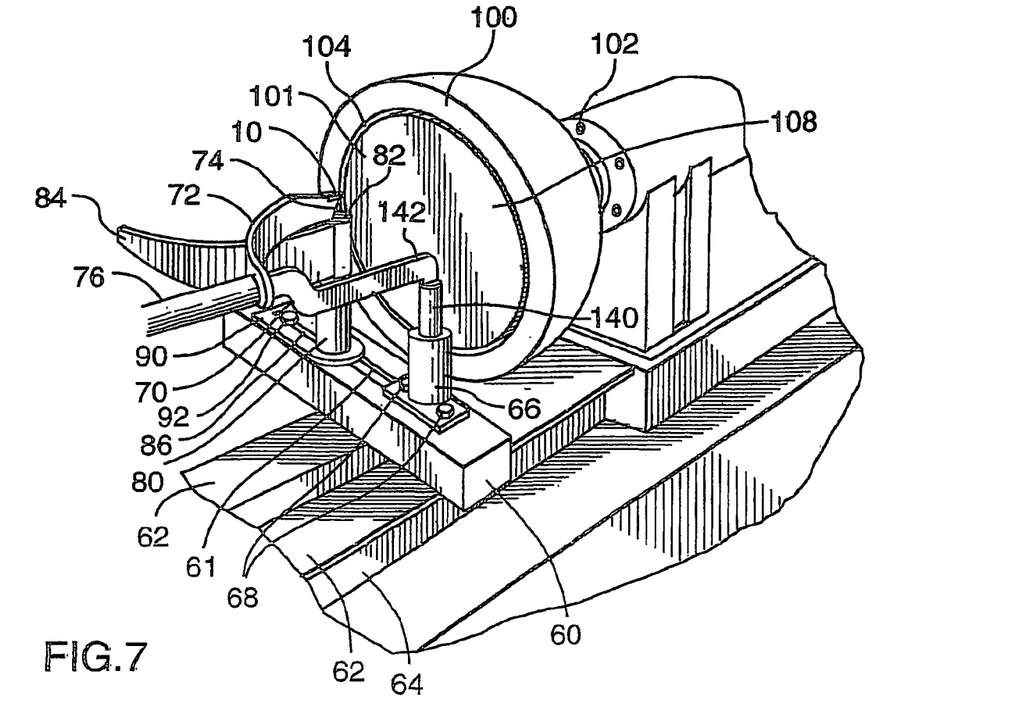
FIG. 7 is a perspective view of a preferred embodiment of the cutting system in a first position.
Figure 8:
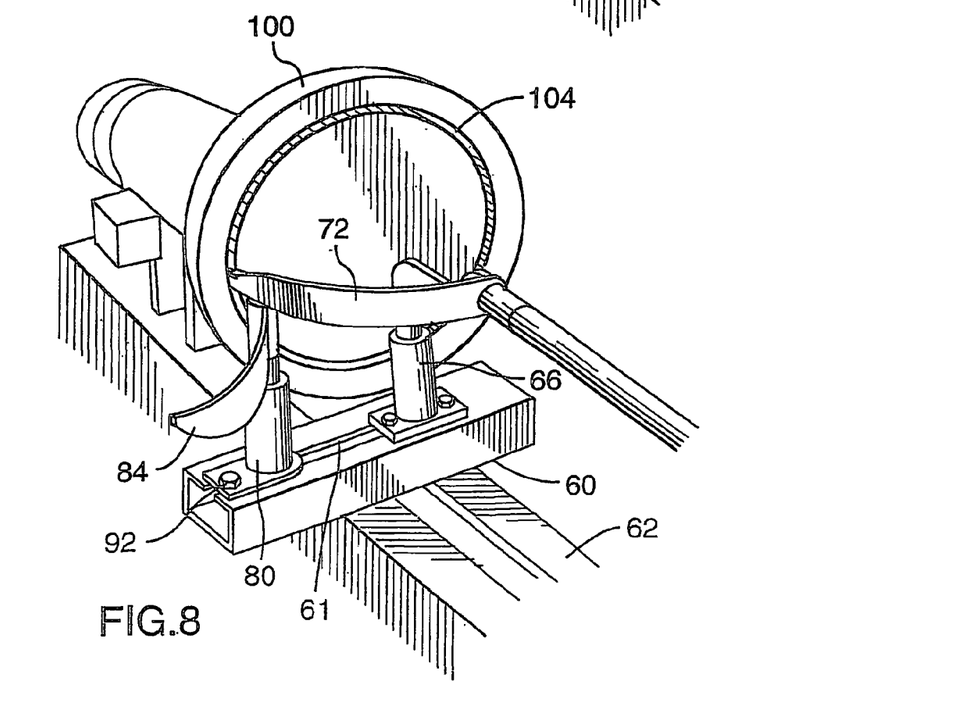
FIG. 8 is another perspective view of the preferred embodiment of the cutting system in this first position.
Figure 9:
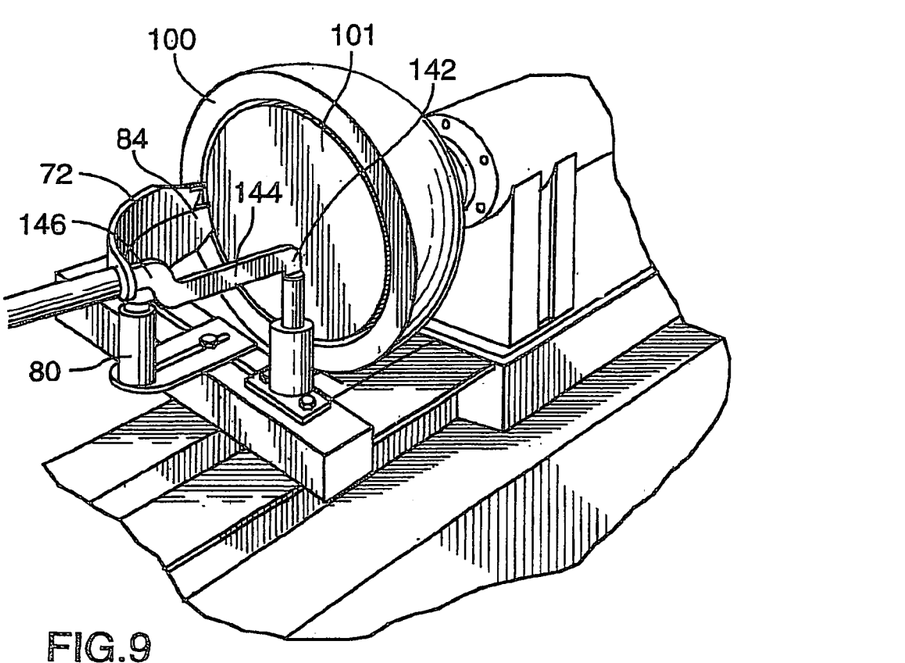
FIG. 9 is a perspective view of the preferred embodiment of the cutting system in a second position.
Figure 10:
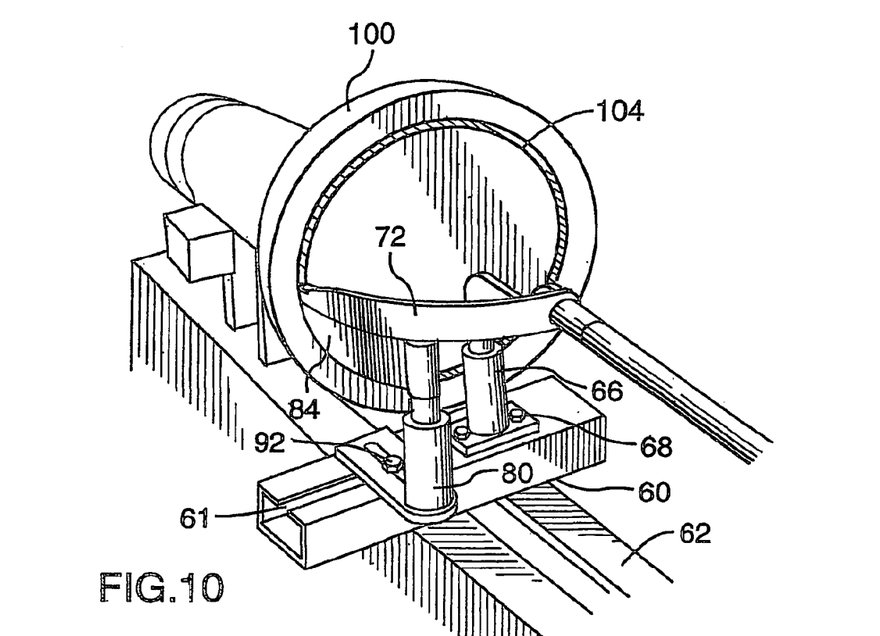
FIG. 10 is another perspective view of the preferred embodiment of the cutting system in the second position.
Figure 11:
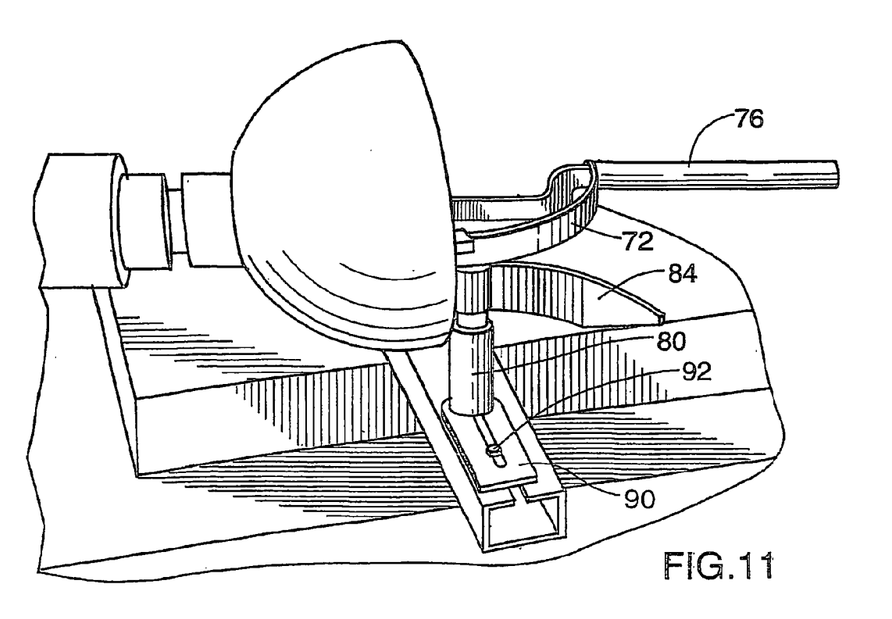
FIG. 11 is a further perspective view of the preferred embodiment of the cutting system in the first position which is also shown in FIGS. 7 and 8.

Another preferred feature of the present system is the manner in which the cutting tool 70 is mounted on the post 66. As shown in FIGS. 7 and 9, for example, there is a short upward vertical extension of the post at 140. Mounted on the top of this extension is a bent bar 142 which has a horizontally extending section 144 and then a Z-shaped section 146 to which the aforementioned handle 76 is connected. It will be particularly noted that the top of the horizontally extending section 144 is positioned below the axis for rotation of the lathe. It will be understood that this axis for rotation is located approximately in the center of the wood block from which the bowl is being formed. The advantage of supporting a cutting tool in this manner is that this arrangement enables the standard tail stock (not shown) of the lathe to be used, if required to support the wood block as it is being rotated. In other words the tail stock can be engaged with the centre of the face of the wood block 100 in which the groove 104 is being formed. Thus at various times during the use of the system of the invention, the tail stock of the lathe can be used to prevent excess vibration which could otherwise be a problem, particularly on a weaker lathe machine.

FIGS. 12 and 13 illustrate an alternate configuration for the curved tool holder that holds and support the cutting piece 10. This alternate curved tool holder 150 can be used in place of the cutting portion 72 shown in FIGS. 6 to 11 of the drawings. As with the version shown in FIGS. 6 to 11 this tool holder extends through a circular arc from a rear end 152 to its lead end 154. In one particular embodiment this arc has a radius of 6.81 inches but the radius can clearly vary depending upon the particular coring requirements. The holder can be made from a strip of steel which has a width in one particular embodiment of 1.50 inches. The holder 150 has a relatively narrow or short front end section 156 on which the cutting piece 10 can be mounted. There is a sloping section at 158 where the top edge 160 of the holder slopes down to the front end section 156. In the illustrated embodiment, the angle Z of the slope is about 30 degrees. Also in a preferred embodiment the thickness of the steel strip forming the holder is 0.25 inch. A threaded bore 162 is formed in the front end section 156 and, as indicated, this bore is sized to receive a screw used to hold the cutting piece.

It will be particularly noted that the top edge at 164 of the front end section extends at a small angle to the horizontal and at the same small angle to the main portion of the top edge on the rear section of the holder. In one preferred embodiment, this small angle is 5 degrees with the top edge section 164 sloping downwardly and rearwardly. The advantage of this configuration is that the cutting piece 10 can then be made with parallel top and bottom surfaces. By mounting the cutting piece on a slightly sloping surface, the top 132 of the cutting piece will then be sloped at a small acute angle downwardly and rearwardly in the preferred manner.

It has been found that with the use of the cutting piece and cutting tool of the invention and with the use of the above described system for forming a bowl, a wood bowl can be produced which has a good finish with the wood fibres cleanly severed. In addition with the use of the cutting devices in the aforementioned system, a user generally has no difficulty coring the wood block to where the wood core will break out with only a slight tap or will simply fall out, a result which is generally not obtained with other known methods.

Since various modifications can be made in the invention as hereinabove described, and many different embodiments of same can be made within the spirit and scope of the invention, it is intended that all matter contained in the above specification shall be interpreted as illustrative only and not in a limiting sense. All variations and modifications of this invention as fall within the scope of the accompanying claims are intended to be part of this invention.

The embodiments of the invention in which an exclusive property or privilege is claimed are defined as follows:

1. A cutting piece for securement to a lead end of a cutting tool comprising:
   a rear portion securable to said lead end of said cutting tool by securing means formed on said rear portion, and
   a lead portion extending forwardly from said rear portion, said lead portion being narrower in a transverse direction than a forward end of said rear portion, having a front section adapted to extend beyond the lead end of said cutting tool, and having two sidewalls located on opposite sides of said lead portion, said front section having an upper side angled downwardly and forwardly and a lower side angled upwardly and forwardly such that said upper and lower sides form a front end of said lead portion and said front end forms a leading cutting edge;
   wherein said rear portion includes further cutting edges each extending outwardly from a respective one of said sidewalls of said lead portion.

2. A cutting piece according to claim 1 wherein said cutting piece is made of steel and wherein said upper side and said lower side define an angle not exceeding 90 degrees.

3. A cutting piece according to claim 1 wherein said securing means is a bore formed in the rear portion and adapted to receive a screw for attachment of said cutting piece to said lead end of said cutting tool.

4. A cutting piece according to claim 1 wherein said rear portion includes a bottom side having a plurality of horizontal grooves which are releasably engageable with mating ridges on an upper side of said lead end of said cutting tool.

5. A cutting piece according to claim 1 wherein said rear portion has an upper side and leading, vertically extending faces from which said lead portion extends and said further cutting edges are formed where said vertically extending faces meet said upper side.

6. A cutting tool for use with a lathe, said cutting tool having a lead end and first and second sidewalls and a cutting piece formed on said lead end and comprising a rear portion and a lead portion extending forwardly from said rear portion, said lead portion being narrower in a transverse direction than a forward end of said rear portion and having two sidewalls located on opposite sides of said lead portion, said lead portion having an upper side angled downwardly and forwardly and a lower side angled upwardly and forwardly such that said upper and lower sides form a front end of said lead portion and said front end forms a leading cutting edge, wherein said rear portion includes further cutting edges each extending outwardly from a respective one of said sidewalls of said lead portion.

7. Use of the cutting piece according to claim 1 secured to said lead end, to cut a block rotating on a lathe, whereby said cutting piece creates a groove in said block of greater width that the width of said cutting tool thereby allowing said cutting tool to be advanced into said groove.

8. A cutting tool for use with a lathe, said tool including an elongate body portion which is curved in the lengthwise direction thereof, has two lateral sides located on opposite sides of said body portion, and has a lead end with a lead portion projecting forwardly beyond said two lateral sides, said lead portion including a front section having an upper side angled downwardly and forwardly and a lower side engled upwardly and forwardly such that said upper and lower sides form a leading cutting edge, said lead portion also having two vertically extending sidewalls located on opposite sides thereof, wherein said lead end is formed with outer cutting edges extending transversely of said lateral sides and outwardly from a respective one of said vertically extending sidewalls of said lead portion.

9. A cutting tool according to claim 8 wherein a separable cutting piece forms said lead portion and said outer cutting edges and said elongate body portion includes a curved, elongate holder for said cutting piece, said cutting piece being attached to said elongate holder by a threaded fastener.

10. A cutting tool according to claim 9 wherein said cutting piece includes a rear portion having a bore extending therethrough and said threaded fastener extends through said bore in order to attach said cutting piece to said curved, elongate holder.

11. A cutting tool according to claim 8 wherein said upper side and said lower side define an acute angle that is less than 90 degrees.

12. A cutting piece for cutting a groove in a workpiece mounted in a lathe, said cutting piece comprising a rear portion securable to a lead end of a cutting tool and a lead portion rigidly connected to said rear portion and extending forwardly from said rear portion, said lead portion being narrower in a transverse direction than an adjacent forward end of said rear portion, being adapted to extend beyond said lead end of the cutting tool, and having two sidewalls located on opposite sides of said lead portion and a sloping upper side that extends downwardly and forwardly and a lower side sloping upwardly and forwardly such that said upper and lower sides form a leading cutting edge, wherein said upper and lower sides define an angle not exceeding ninety degrees and said rear portion has further cutting edges each extending outwardly from a respective one of said sidewalls of said lead portion.

13. A cutting piece according to claim 12 wherein said leading cutting edge extends substantially transversely to a central longitudinal axis of the cutting piece.

14. A cutting piece according to claim 12 wherein said rear portion has a top surface and leading faces from which said lead portion extends, said further cutting edges being formed where said leading faces meet said top surface.

15. A cutting piece according to claim 14 wherein said top surface of the rear portion slopes upwardly in a forwards direction towards said lead portion when said cutting piece is secured to said lead end of said cutting tool.

16. A cutting piece according to claim 12 wherein said rear portion includes a bottom side having a plurality of horizontal grooves which are releasably engageable with mating ridges on an upper side of said lead end of said cutting tool.

17. A cutting piece according to claim 12 wherein said rear portion has a vertically extending bore extending therethrough, said bore being provided for a screw that can be used to secure said cutting piece to said cutting tool.

18. A cutting piece according to claim 12 wherein said upper and lower sides define an acute angle of approximately 75 degrees.

* * * * *